United States Patent
Kim et al.

(10) Patent No.: US 11,159,891 B2
(45) Date of Patent: Oct. 26, 2021

(54) MAGNETIC SHIELD STRUCTURE FOR SPEAKER AND ELECTRONIC DEVICE INCLUDING THE SAME

(71) Applicant: Samsung Electronics Co., Ltd., Gyeonggi-do (KR)

(72) Inventors: Jungho Kim, Gyeonggi-do (KR); Minsoo Kim, Gyeonggi-do (KR); Jinwan An, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/684,661

(22) Filed: Nov. 15, 2019

(65) Prior Publication Data

US 2020/0169816 A1 May 28, 2020

(30) Foreign Application Priority Data

Nov. 23, 2018 (KR) .......................... 10-2018-0146273

(51) Int. Cl.
*H04R 1/02* (2006.01)
*H04R 9/06* (2006.01)
(Continued)

(52) U.S. Cl.
CPC ............... *H04R 9/06* (2013.01); *H04R 1/025* (2013.01); *H04R 1/028* (2013.01); *H04R 7/04* (2013.01); *H04R 7/16* (2013.01); *H04R 9/025* (2013.01); *H04R 2400/11* (2013.01); *H04R 2499/11* (2013.01); *H04R 2499/15* (2013.01)

(58) Field of Classification Search
CPC .......... H04R 1/028; H04R 1/403; H04R 3/12; H04R 7/16; H04R 2499/11
See application file for complete search history.

(56) References Cited

U.S. PATENT DOCUMENTS 8,934,228 B2   1/2015   Franklin et al.
10,412,476 B2*  9/2019   Lim .......................... H04R 7/16
(Continued)

FOREIGN PATENT DOCUMENTS

JP    2005-260536 A    9/2005
KR    10-2012-0069256 A    6/2012
(Continued)

OTHER PUBLICATIONS

International Search Report dated Apr. 20, 2020.

*Primary Examiner* — Amir H Etesam
(74) *Attorney, Agent, or Firm* — Cha & Reiter, LLC

(57) ABSTRACT

Provided is an electronic device. The electronic device may include: a housing including a front plate, a rear plate facing away from the front plate, and a side member surrounding a first space between the front plate and the rear plate; a display panel exposed to an exterior of the electronic device through the front plate and configured to detect a pen input using a magnetic field; a speaker structure disposed between the display panel and the rear plate, and including a first surface facing the display panel, a second surface facing in a direction opposite the display panel, a side surface surrounding a second space between the first surface and the second surface, and a yoke facing the first surface; and a first shield structure made of a ferromagnetic material and disposed on the first surface.

19 Claims, 11 Drawing Sheets

(51) Int. Cl.
*H04R 9/02* (2006.01)
*H04R 7/16* (2006.01)
*H04R 7/04* (2006.01)

(56) References Cited

U.S. PATENT DOCUMENTS

| | | |
|---|---|---|
| 2005/0220320 A1 | 10/2005 | Kim et al. |
| 2006/0182304 A1 | 8/2006 | Takase et al. |
| 2012/0051570 A1 | 3/2012 | Arche |
| 2012/0155695 A1 | 6/2012 | Park |
| 2013/0260823 A1 | 10/2013 | Shukla et al. |
| 2014/0086434 A1* | 3/2014 | Bang .................. G10L 21/0232 381/98 |
| 2017/0311422 A1* | 10/2017 | Arai ....................... H05B 47/19 |
| 2018/0035188 A1 | 2/2018 | Lim et al. |
| 2020/0404808 A1 | 12/2020 | Kim et al. |
| 2021/0034119 A1 | 2/2021 | Yoon et al. |

FOREIGN PATENT DOCUMENTS

| | | |
|---|---|---|
| KR | 10-1612791 B1 | 4/2016 |
| KR | 10-2018-0013403 A | 2/2018 |

* cited by examiner

MAGNETIC SHIELD STRUCTURE FOR SPEAKER AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2018-0146273, filed on Nov. 23, 2018, in the Korean Intellectual Property Office, the disclosure of which is incorporated by reference herein in its entirety.

TECHNICAL FIELD

Certain embodiments of the disclosure generally relate to a magnetic shield structure for a speaker and an electronic device including the same.

BACKGROUND

Electronic devices, such as home appliances, electronic organizers, portable multimedia players, mobile communication terminals, tablet personal computers, video/audio devices, desktop or laptop computers, or car navigation systems, may perform various functions according to the programs installed therein. For example, such an electronic device may output stored information as sound or images. As the degree of integration increases and high-speed high-capacity wireless communication becomes popular in recent years, an electronic device may perform an increasingly greater variety of functions. For example, various functions related to communication, entertainment such as games, multimedia such as music/video playback, security for mobile banking, schedule management, and electronic wallets may be integrated into a single electronic device.

In the case of entertainment and multimedia functions, image quality and sound quality of the electronic device may be keys to meeting the user's satisfaction. High image quality can be accomplished using a large-screen high-resolution display panel, and high sound quality can be accomplished using a speaker with even output in the audible frequency range.

Such a speaker may include a diaphragm facing the front surface of the electronic device, and a magnet and coil facing the rear surface of the electronic device. When an alternating current is applied to the coil, the coil becomes an electromagnet and the N and S poles change according to the electrical signal. Then the coil exerts attraction and repulsion on the magnet, and the diaphragm attached to the coil may vibrate up and down, generating sound caused by the vibration.

Due to the intensity of the current applied to the speaker, the coil may generate heat. This may especially be true as the operating time of the speaker increases. Most of the heat generated by the coil is transferred to the magnet with low thermal resistance, and the heat of the magnet can be transferred directly to the rear cover of the electronic device. In the rear cover, a hot spot where heat is concentrated may occur at a portion corresponding to the magnet.

When excessive heat is generated in the speaker, the intensity of the current applied to the coil may be reduced. To reduce heat generation, the frequency of the current may be adjusted to a specific band. However, this may limit the sound output of the speaker and/or reduce audio quality.

In addition, when the speaker coil is disposed in a direction toward the display of the electronic device away from the rear cover, the occurrence of the hot spot in the rear cover can be reduced. But in doing so, the magnetism of the coil can affect the display and components inside the electronic device.

The above information is presented as background information only to assist with an understanding of the disclosure. No determination has been made, and no assertion is made, as to whether any of the above might be applicable as prior art with regard to the disclosure.

SUMMARY

The instant disclosure is made in view of the above problems. Accordingly, the instant disclosure relates to provision of a magnetic shield structure for a speaker and an electronic device including the same wherein the magnetism of the speaker coil can be shielded even when the speaker coil is facing the display.

Additional aspects will be set forth in part in the description which follows and, in part, will be apparent from the description, or may be learned by practice of the presented embodiments.

According to an embodiment of the disclosure, an electronic device is provided. The electronic device may include: a housing including a front plate, a rear plate facing away from the front plate, and a side member surrounding a first space between the front plate and the rear plate; a display panel exposed to an exterior of the electronic device through the front plate and configured to detect a pen input using a magnetic field; a speaker structure disposed between the display panel and the rear plate, and including a first surface facing the display panel, a second surface facing in a direction opposite the display panel, a side surface surrounding a second space between the first surface and the second surface, and a yoke facing the first surface; and a first shield structure made of a ferromagnetic material and disposed on the first surface.

According to an embodiment of the disclosure, an electronic device is provided. The electronic device may include: a housing including a front plate, a rear plate facing away from the front plate, and a side member surrounding a first space between the front plate and the rear plate; a display panel exposed to an exterior of the electronic device through the front plate; a speaker box disposed in a second space between the display panel and the rear plate and connected to a through hole penetrating the side member to form an acoustic path; and a speaker housing disposed within the speaker box, wherein the speaker housing may include: a speaker structure including a first surface facing the display panel, a second surface facing in a direction opposite the display panel, a frame surrounding a third space between the first surface and the second surface, a yoke facing the first surface, and a diaphragm disposed on the second surface; and a first shield structure made of a ferromagnetic material and disposed on the first surface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to an embodiment of the disclosure, in the magnetic shield structure for the speaker and the electronic device including the same, the heat generated in the speaker can be transferred in a direction toward the display and away from the rear cover, preventing generation of a hot spot in the rear cover.

According to an embodiment of the disclosure, in the magnetic shield structure for the speaker and the electronic device including the same, the magnetism caused by the speaker can be shielded so as to prevent damage or malfunction in the electronic device due to the magnetism.

According to an embodiment of the disclosure, in the magnetic shield structure for the speaker and the electronic device including the same, the quality of the speaker can be improved by shielding the magnetism of the speaker and increasing the magnetic flux density at the same time.

Figure 1:
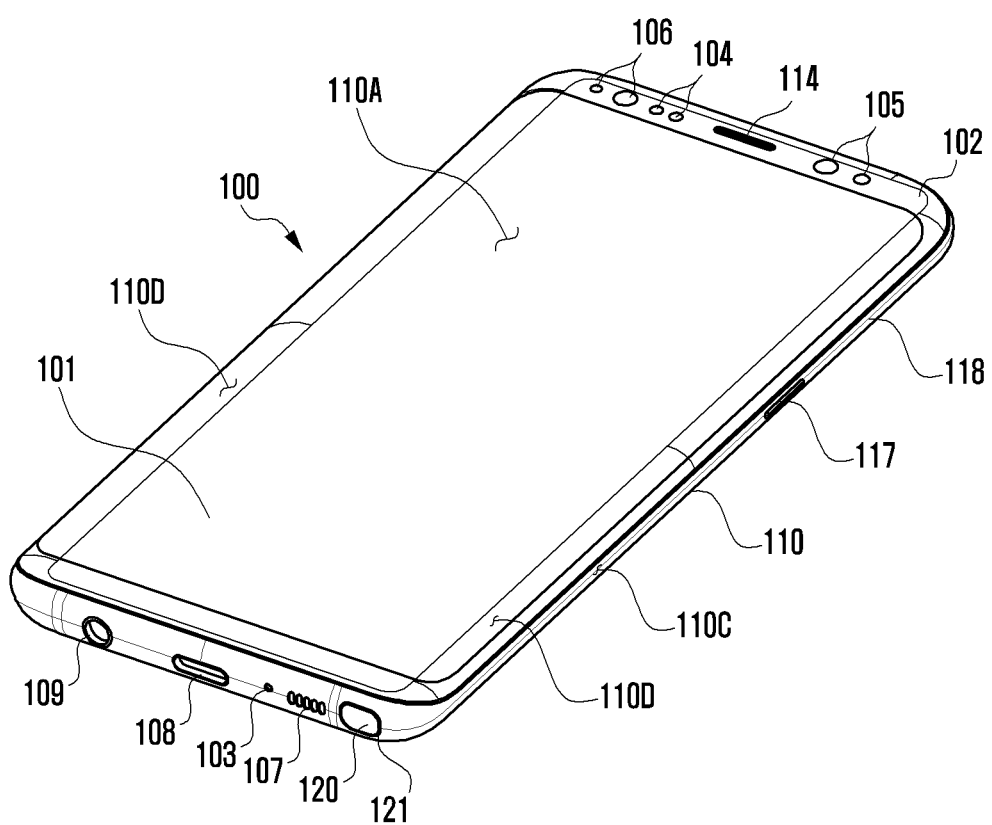
FIG. 1 is a front perspective view of a mobile electronic device according to an embodiment.
Figure 2:
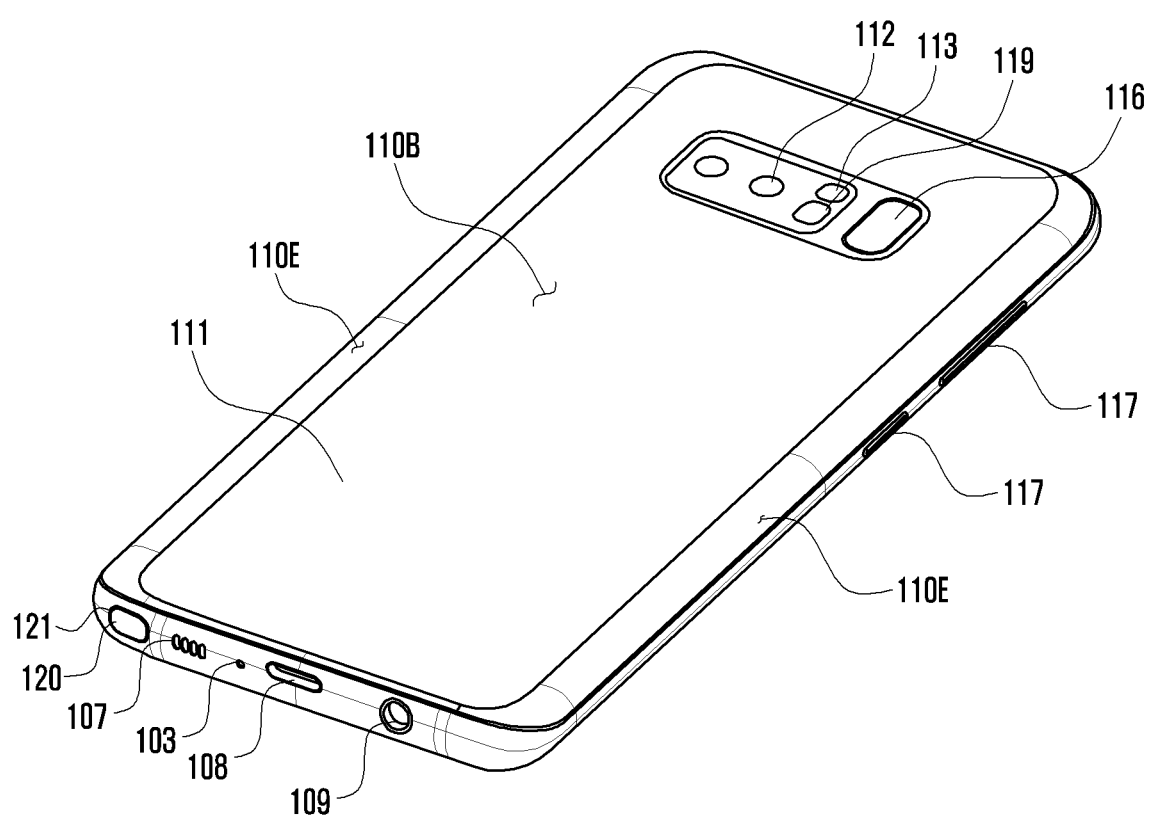
FIG. 2 is a rear perspective view of the electronic device shown in FIG. 1.
Figure 3:
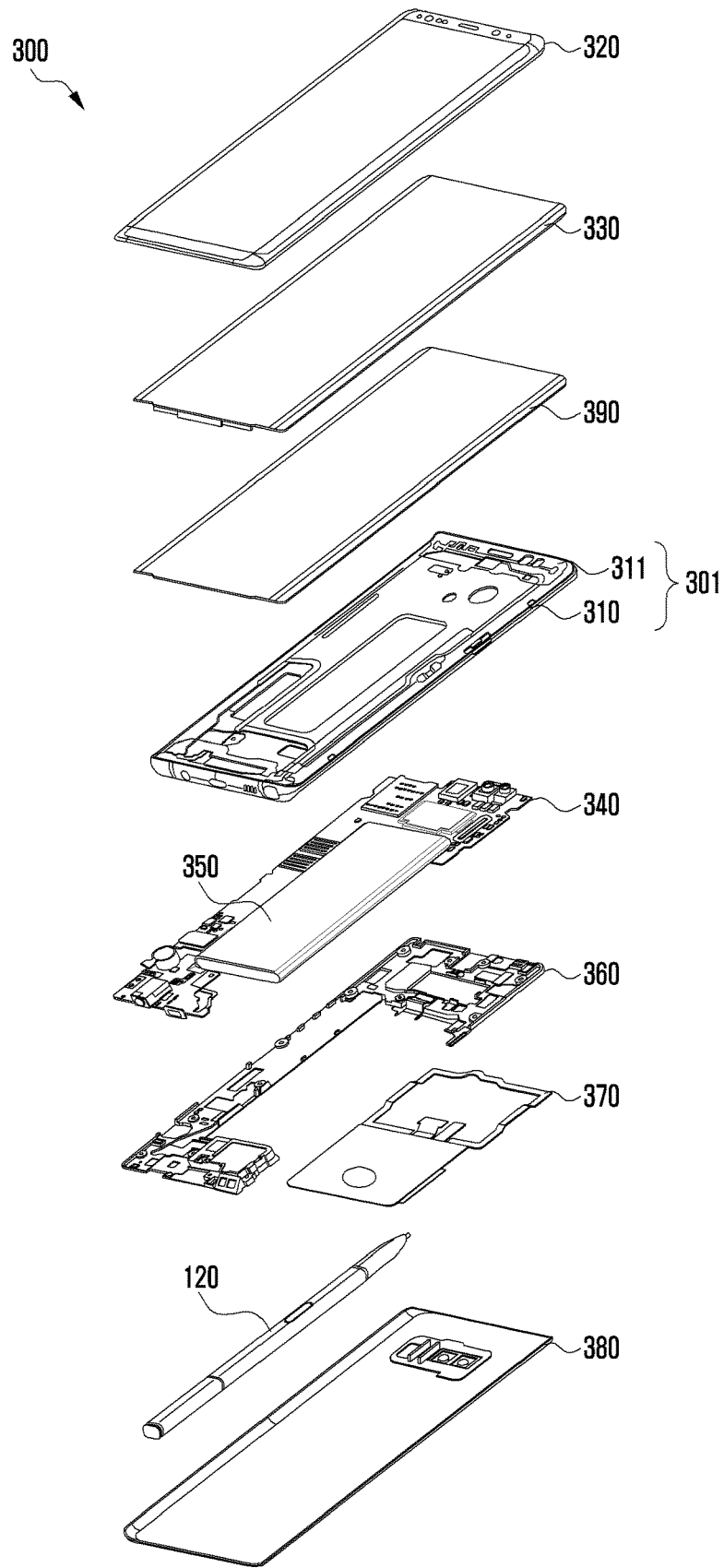
FIG. 3 is an exploded perspective view of the electronic device shown in FIG. 1.

FIG. 1 is a perspective view of the front surface of a mobile electronic device according to an embodiment. FIG. 2 is a perspective view of the rear surface of the electronic device of FIG. 1. FIG. 3 is an exploded perspective view of the electronic device of FIG. 1.

Referring to FIG. 1 and FIG. 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that includes at least a part of the first surface 110A, a part of the second surface 110B, and a part of the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

In the illustrated embodiment, the front plate 102 may include two first areas 110D on both ends of the long edge of the front plate 102 such that the two first areas 110D bend from the first surface 110A toward the rear plate 111 and extend seamlessly from the flat or central portion of the front plate 102. In the illustrated embodiment (see FIG. 2), the rear plate 111 may include two second areas 110E on both ends of the long edge such that the two second areas 110E bend from the second surface 110B toward the front plate 102 and extend seamlessly from the flat or central portion of the rear plate 111. In some embodiments, the front plate 102 (or the rear plate 111) may include only one of the first areas 110D (or the second areas 110E). In another embodiment, a part of the first areas 110D or the second areas 110E may not be included. In the above embodiments, when seen from the side surface of the electronic device 100, the side bezel structure 118 may have a first thickness (or width) on a part of the side surface which does not include the first areas 110D or the second areas 110E as described above, and may have a second thickness that is smaller than the first thickness on a part of the side surface which includes the first areas 110D or the second areas 110E.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the constituent elements (for example, the key input device 117 or the light-emitting element 106) of the electronic device 100 may be omitted, or the electronic device 100 may additionally include additional constituent elements.

The display 101 may be exposed through a corresponding part of the front plate 102, for example. In some embodiments, at least a part of the display 101 may be exposed through the front plate 102 that forms the first areas 110D of the side surface 110C and the first surface 110A. In some embodiments, the display 101 may have a corner formed in substantially the same shape as that of the adjacent outer periphery of the front plate 102. In another embodiment (not illustrated), in order to increase the area of exposure of the display 101, the spacing interval between the outer periphery of the display 101 and the outer periphery of the front plate 102 may be minimized.

In another embodiment (not illustrated), a recess or an opening may be formed in a part of the screen display area of the display 101, and at least one of an audio module 114, a sensor module 104, a camera module 105, and a light-emitting element 106 may be included and aligned with the recess or the opening. In another embodiment (not illustrated), on the back surface of the screen display area of the display 101, at least one of an audio module 114, a sensor module 104, a camera module 105, a fingerprint sensor 116, and a light-emitting element 106 may be included. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 104 and 119 and/or at least a part of the key input device 117 may be arranged in the first areas 110D and/or the second areas 110E.

The audio modules 103, 107, and 114 may include a microphone hole 103 and speaker holes 107 and 114. A microphone for acquiring external sound may be arranged in the microphone hole 103, and a plurality of microphones may be arranged therein such that the direction of the sound can be detected in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate electric signals or data values corresponding to internal operating conditions of the electronic device 100 or the external environment conditions thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, a heart-rate-monitor (HRM) sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented as a soft key, for example, on the display 101. In some embodiments, the key input device may include a sensor module 116 arranged on the second surface 110B of the housing 110.

The light-emitting element 106 may be arranged on the first surface 110A of the housing 110, for example. The light-emitting element 106 may provide information. For example, the light-emitting element 106 may flash when a message is received by the electronic device 100. In another embodiment, the light-emitting element 106 may provide a light source that interworks with operation of the camera module 105, for example. The light-emitting element 106 may include, for example, an LED, an IR LED, and a xenon lamp.

The connector holes 108 and 109 may include a first connector hole 108 capable of receiving a connector (for example, a USB connector) for transmitting/receiving power and/or data to/from an external electronic device, and/or a second connector hole (for example, an earphone jack) 109 capable of receiving a connector for transmitting/receiving an audio signal to/from the external electronic device.

The pen input unit 120 (e.g., a stylus pen) may be inserted into or removed from the housing 110 through a hole 121 formed at the side of the housing 110, and may be easily removed. It may include a button for enabling removal from the housing. The pen input unit 120 may include a separate resonant circuit that works with an electromagnetic induction panel 390 (e.g., a digitizer) included in the electronic device 100. The pen input unit 120 may work with the electromagnetic induction panel 390 via the electro-magnetic resonance (EMR) method, active electrical stylus (AES) method, and/or the electric coupled resonance (ECR) method.

With reference to FIG. 3, the electronic device 300 may include a side bezel structure 310, a first support member 311 (e.g., bracket), a front plate 320, a display 330, an electromagnetic induction panel 390, a sub printed circuit board 340, a battery 350, a printed circuit board 360, a second support member 370 (e.g., rear case), a pen input unit 120, and a rear plate 380. In a certain embodiment, at least one of the components of the electronic device 300 (e.g., first support member 311 or second support member 370) may be omitted, or additional components may be added to the electronic device 300. Some of the components of the electronic device 300 may be the same as or similar to those of the electronic device 100 of FIG. 1 or 2, and repeated descriptions thereof will be omitted for the sake of simplicity.

The electromagnetic induction panel 390 (e.g., digitizer) may be used to detect the input of the pen input unit 120. For example, the electromagnetic induction panel 390 may include a printed circuit board (PCB) (e.g., flexible printed circuit board (FPCB)) and a shield sheet. The shield sheet may prevent electromagnetic fields generated by other components of the electronic device 300 (e.g., display module) from interfering with the printed circuit board and electromagnetic induction panel and vice versa. The shield sheet may block the electromagnetic fields generated by the other components of the electronic device 300 so that the input from the pen input unit 120 may be accurately transmitted to the coil included in the electromagnetic induction panel 390. In an embodiment, the electromagnetic induction panel 390 may include an opening formed at a portion corresponding to the biometric sensor mounted in the electronic device 300.

The first support member 311 may be disposed inside the electronic device 300 to be connected to the side bezel structure 310 or may be formed as a single body with the side bezel structure 310. The first support member 311 may be made of, for example, a metal material and/or a non-metal material (e.g., polymer). The first support member 311 may be coupled to the display 330 on one surface and may be coupled to the printed circuit board 360 on the other opposing surface. The processor, memory, and/or interface may be mounted on the printed circuit board 360. The processor may include one or more of, for example, a central processing unit, an application processor, a graphics processing unit, an image signal processor, a sensor hub processor, and a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface may electrically and/or physically connect the electronic device 300 to an external electronic device, and may include, for example, a USB connector, an SD card or MMC connector, or an audio connector.

The sub printed circuit board 340 may be used to mount a camera module, a receiver speaker, and an iris recognition LED.

The battery 350 supplies power to at least one component of the electronic device 300, and may include, for example, a non-rechargeable primary cell, a rechargeable secondary cell, or a fuel cell. At least a portion of the battery 350 may be disposed substantially coplanar with, for example, the printed circuit board 360. The battery 350 may be integrally disposed in the electronic device 300 or may be detachably attached to the electronic device 300.

The second support member 370 may be disposed between the rear plate 380 and the battery 350. The second support member 370 may include an antenna. The antenna may include, for example, a near field communication (NFC) antenna, a wireless charging antenna, or a magnetic secure transmission (MST) antenna. For example, the antenna may perform short-range communication with an external device, or may wirelessly transmit and receive power required for charging. In another embodiment, an antenna structure may be formed by a combination of a portion of the side bezel structure 310 and/or a portion of the first support member 311. The audio module 103, 107 or 114, the microphone hole 103 and the speaker hole 107 or 114 may be disposed on the second support member 370.

In one embodiment of the disclosure, the electronic device 300 may include a housing 301 (e.g., side bezel structure 310 and first support member 311), a speaker structure, and a magnetic shield structure. The speaker structure may be located in a space adjacent to the through hole between the first support member of the housing 301 and the rear plate 380. The second support member 370 may be disposed under the housing 301.

Figure 4:
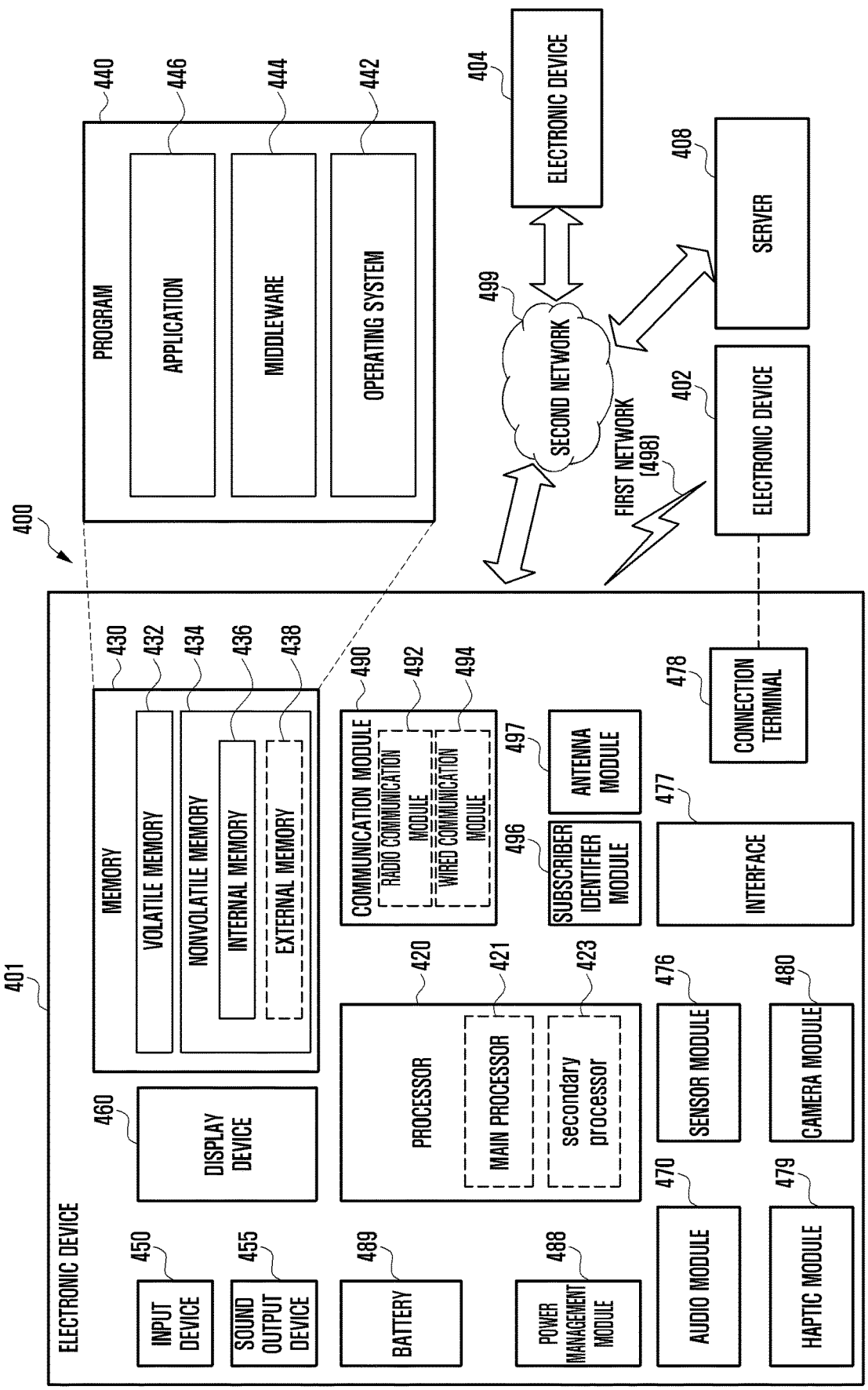
FIG. 4 is a block diagram of an electronic device in a network environment according to an embodiment.

FIG. 4 is a block diagram of an electronic device 401 in a network environment 400 according to an embodiment. With reference to FIG. 4, in the network environment 400, the electronic device 401 may communicate with an electronic device 402 through a first network 498 (e.g., short-range wireless communication network) or may communicate with an electronic device 404 or a server 408 through a second network 499 (e.g., long-distance wireless communication network). In one embodiment, the electronic device 401 may communicate with the electronic device 404 through the server 408. According to an embodiment, the electronic device 401 may include a processor 420, a memory 430, an input unit 450, a sound output unit 455, a display unit 460, an audio module 470, a sensor module 476, an interface 477, a haptic module 479, a camera module 480, a power management module 488, a battery 489, a communication module 490, a subscriber identification module 496, and an antenna module 497. In a certain embodiment, at least one component (e.g., display unit 460 or camera module 480) among the components of the electronic device 401 may be omitted, or other components may be added to the electronic device 401. In one embodiment, some of these components may be implemented as an integrated circuit. For example, the sensor module 476 (e.g., fingerprint sensor, iris sensor, or illuminance sensor) may be embedded in the display unit 460 (e.g., display).

The processor 420 may execute, for example, software (e.g., program 440) to control at least one of other components (e.g., hardware component or software component) of the electronic device 401 connected to the processor 420, and may process a variety of data or perform various computations. In one embodiment, as part of data processing or computation, the processor 420 may load a command or data received from other components (e.g., sensor module 476 or communication module 490) into the volatile memory 432, process the command or data stored in the volatile memory 432, and store the result data in the non-volatile memory 434. In one embodiment, the processor 420 may include a main processor 421 (e.g., central processing unit, or application processor), and a secondary processor 423 (e.g., graphics processing unit, image signal processor, sensor hub processor, or communication processor), which may operate independently of or in cooperation with the main processor 421. Additionally or alternatively, the secondary processor 423 may consume less power or may be more specialized in a specific function compared with the main processor 421. The secondary processor 423 may be implemented separately from or as part of the main processor 421.

The secondary processor 423 may control at least some of the functions or states associated with at least one component (e.g., display unit 460, sensor module 476, or communication module 490) among the components of the electronic device 401, for example, instead of the main processor 421 while the main processor 421 is in an inactive (e.g., sleep) state, or together with the main processor 421 while the main processor 421 is in an active (e.g., application execution) state. In one embodiment, the secondary processor 423 (e.g., image signal processor or communication processor) may be implemented as a part of another component (e.g., camera module 480 or communication module 490) that is functionally related to the secondary processor 423.

The memory 430 may store a variety of data used by at least one component (e.g., processor 420 or sensor module 476) of the electronic device 401. The data may include, for example, software (e.g., program 440) and input data or output data for commands associated with the software. The memory 430 may include a volatile memory 432 or a nonvolatile memory 434.

The programs 440 may be stored in the memory 430 as software, and may include, for example, an operating system 442, a middleware 444, or an application 446.

The input unit 450 may receive a command or data, which can be to be used for a component (e.g., processor 420) of the electronic device 401, from the outside of the electronic device 401 (e.g., user). The input unit 450 may include, for example, a microphone, a mouse, a keyboard, or a digital pen (e.g., stylus pen).

The sound output unit 455 may output a sound signal to the outside of the electronic device 401. The sound output unit 455 may include, for example, a speaker and a receiver. The speaker may be used for general purposes, such as playback of multimedia or recordings, and the receiver may be used for receiving an incoming call. In one embodiment, the receiver may be implemented separately from or as part of the speaker.

The display unit 460 may visually present information to the outside of the electronic device 401 (e.g., user). The display unit 460 may include, for example, a display, a hologram device, or a projector, and a control circuit for controlling these. In one embodiment, the display unit 460 may include a touch circuitry configured to sense a touch, or a sensing circuitry (e.g., pressure sensor) configured to measure the strength of a force caused by a touch action.

The audio module 470 may convert a sound into an electric signal or convert an electric signal into a sound. In one embodiment, the audio module 470 may obtain a sound signal through the input unit 450, and may output a sound signal through the sound output unit 455 or an external electronic device (e.g., electronic device 402 (e.g., speaker or headphone)) wiredly or wirelessly connected to the electronic device 401.

The sensor module 476 may generate an electrical signal or a data value corresponding to the operating state (e.g., power or temperature) of the electronic device 401 or the environmental state (e.g., user state) outside the electronic device 401. The sensor module 476 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 477 may support one or more designated protocols that enable the electronic device 401 to directly or wirelessly connect to an external electronic device (e.g., electronic device 402). In one embodiment, the interface 477 may include, for example, a high-definition multimedia interface (HDMI), a universal serial bus (USB) interface, an SD card interface, or an audio interface.

The connection terminal 478 may include a connector through which the electronic device 401 can be physically connected to an external electronic device (e.g., electronic device 402). In one embodiment, the connection terminal 478 may include, for example, an HDMI connector, a USB connector, an SD card connector, or an audio connector (e.g., headphone connector).

The haptic module 479 may convert an electrical signal into a mechanical stimulus (e.g., vibration or motion) or an electrical stimulus that can be perceived by the user through tactile or kinesthetic senses. In one embodiment, the haptic module 479 may include, for example, a motor, a piezoelectric element, or an electric stimulator.

The camera module 480 may capture a still image or a moving image. In one embodiment, the camera module 480 may include one or more lenses, image sensors, image signal processors, or flashes.

The power management module 488 may manage the power supplied to the electronic device 401. The power management module 488 may be implemented as a part of a power management integrated circuit (PMIC).

The battery 489 may supply power to at least one component of the electronic device 401. In one embodiment, the battery 489 may include, for example, a non-rechargeable primary cell, a rechargeable secondary cell, or a fuel cell.

The communication module 490 may establish a wired or wireless communication channel between the electronic device 401 and the external electronic device (e.g., electronic device 402, electronic device 404, or server 408) and support communication through the established communication channel. The communication module 490 may include at least one communication processor that can operate separately from the processor 420 (e.g., application processor) to support wired or wireless communication. In one embodiment, the communication module 490 may include a wireless communication module 492 (e.g., cellular communication module, short-range wireless communication module, or global navigation satellite system (GNSS) communication module), or a wired communication module 494 (e.g., local area network (LAN) communication module, or power line communication module). The corresponding communication module may communicate with an external electronic device through the first network 498 (e.g., short-range communication network such as Bluetooth, Wi-Fi direct, or infrared data association (IrDA)) or through the second network 499 (e.g., long-distance communication network such as a cellular network, the Internet, or a computer network like a LAN or WAN). The above various communication modules may be implemented as one component (e.g., single chip) or as separate components (e.g., multiple chips). The wireless communication module 492 may identify and authenticate the electronic device 401 in the communication network such as the first network 498 or the second network 499 by using subscriber information stored in the subscriber identification module 496.

The antenna module 497 may transmit or receive a signal or power to or from the outside (e.g., external electronic device). In one embodiment, the antenna module 497 may include one antenna having a radiator made of a conductor or conductive pattern formed on a substrate (e.g., PCB). In one embodiment, the antenna module 497 may include a plurality of antennas. In this case, at least one antenna suitable for the communication scheme used in the communication network such as the first network 498 or the second network 499 may be selected from the plurality of antennas by, for example, the communication module 490. The signal or power may be transmitted or received between the communication module 490 and the external electronic device through the selected at least one antenna. In one embodiment, in addition to the radiator, another component (e.g., RFIC) may be further formed as a part of the antenna module 497.

At least some of the above components may be connected to each other via a communication scheme between peripherals (e.g., bus, general purpose input and output (GPIO), serial peripheral interface (SPI), or mobile industry processor interface (MIPI)), and may exchange signals (e.g., commands or data) with each other.

Some of the components of the electronic device 401 may be the same as or similar to those of the electronic device 100 of FIG. 1 or 2, and repeated descriptions thereof will be omitted.

In one embodiment, commands or data may be exchanged between the electronic device 401 and the external electronic device 404 through the server 408 connected to the second network 499. The electronic devices 402 and 404 may be of the same type as or a different type from the electronic device 401. In one embodiment, all or some of the operations that can be performed by the electronic device 401 may be performed by one or more of the external electronic devices 402, 404 and 408. For example, to perform a certain function or service automatically or upon request, the electronic device 401 may, instead of or in addition to executing the function or service, request one or more external electronic devices to execute at least some of the function or service. Upon reception of the request, the external electronic devices may execute at least a portion of the requested function or service or an additional function or service related to the request, and return the execution results to the electronic device 401. The electronic device 401 may further process the received results if necessary and provide the processing results as a response to the requested function or service. To this end, technologies such as cloud computing, distributed computing, and client-server computing may be utilized.

Figure 5:
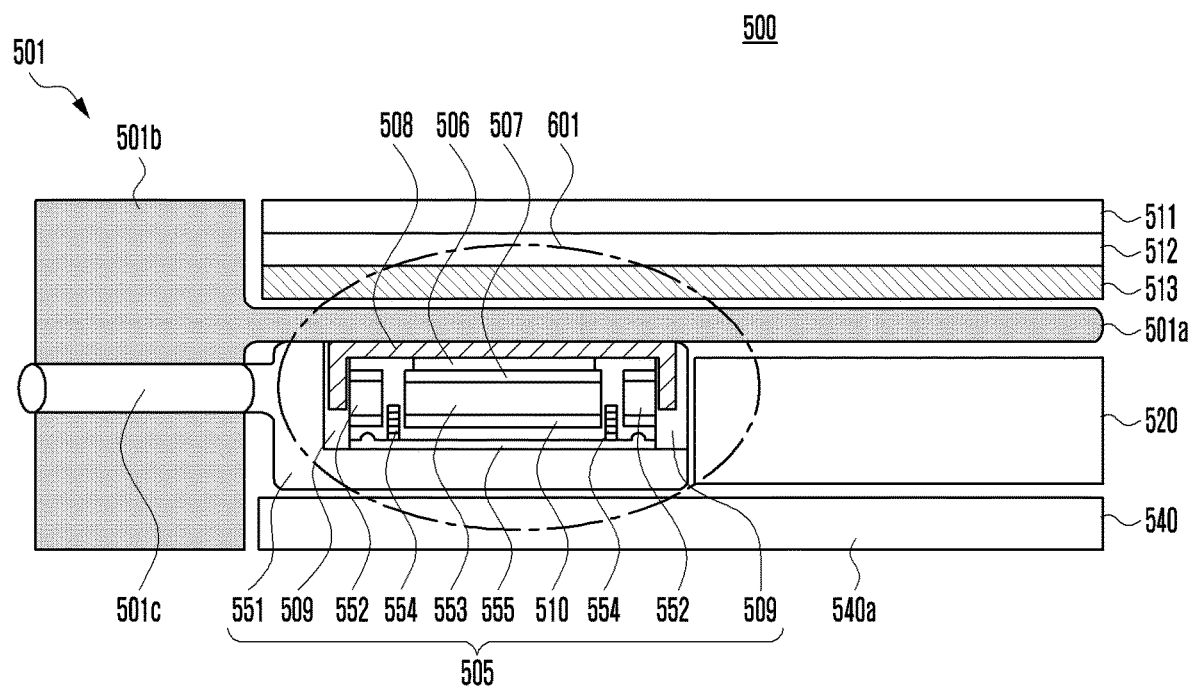
FIG. 5 is a cross-sectional view of a speaker 505 and a magnetic shield structure of the electronic device according to an embodiment of the disclosure.

FIG. 5 is a cross-sectional view of a speaker 505 and a magnetic shield structure 508 of the electronic device 500

Figure 6:
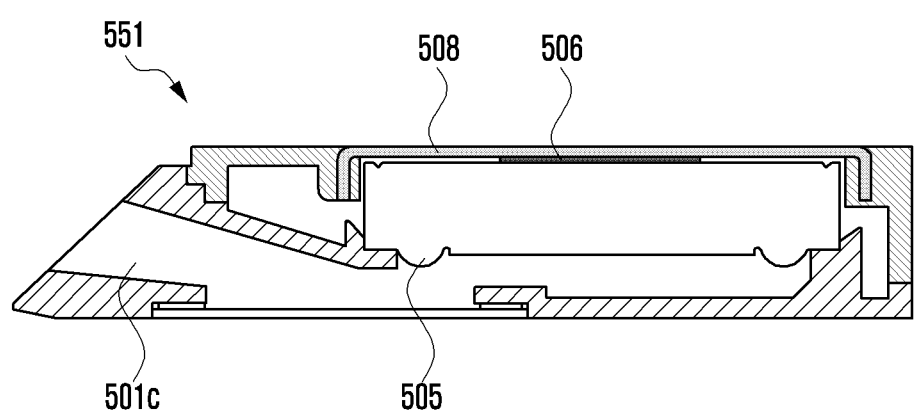
FIG. 6 is an enlarged view of region 601 in FIG. 5 depicting the speaker and the magnetic shield structure according to an embodiment of the disclosure.

(e.g., electronic device 300 in FIG. 3) according to an embodiment of the disclosure. FIG. 6 is an enlarged view of region 601 in FIG. 5 depicting the speaker 505 and the magnetic shield structure 508 according to an embodiment of the disclosure.

With reference to FIG. 5 and FIG. 6, in one embodiment of the disclosure, the electronic device 500 may include a housing 501 including 501a and 501b (e.g., housing 110 in FIG. 1), a speaker 505, and a magnetic shield structure 508.

In an embodiment, the housing 501 may include a middle plate 501a (e.g., first support member 311 or second support member 370 in FIG. 3) and/or a side bezel structure 501b (e.g., side bezel structure 310 in FIG. 3).

The middle plate 501a and/or the side bezel structure 501b may be made of a metal material (e.g., aluminum). The side bezel structure 501b may be formed to extend from the middle plate 501a.

For example, the side bezel structure 501b may be formed as a single body with the middle plate 501a using die casting. The middle plate 501a may be referred to as a cooling member.

In certain embodiments of the disclosure, the heat generated from the speaker 505 may be discharged away from the speaker 505 through the middle plate 501a and the side bezel structure 501b.

In an embodiment, the front plate 511, the display 512 and/or the electromagnetic induction panel (e.g., electromagnetic induction panel 390 in FIG. 3) may be stacked on the upper surface of the middle plate 501a.

In an embodiment, the rear plate 540 (e.g., rear plate 380 in FIG. 3) may be disposed below the middle plate 501a. The middle plate 501a may support various electronic components such as the display 512, the battery 520 (e.g., battery 350 in FIG. 3) and the speaker 505.

In an embodiment, the side bezel structure 501b may extend from the middle plate 501a. The side bezel structure 501b may have at least one through hole, and the through hole may include a discharge hole 501c.

In an embodiment, the speaker 505 may include a first magnet 552, a second magnet 553, a coil 554, a diaphragm 555, an adhesive member 506, a speaker yoke 507, a magnetic shield structure 508, and/or a frame 509.

The magnetic shield structure 508 and the frame 509 of the speaker 505 may form a speaker housing, and the diaphragm 555 may be disposed at a portion of the speaker housing.

The speaker box 551 may be made of steel or an injectable material (e.g., plastic). The speaker box 551 may be bolted or adhered to the middle plate 501a.

In various different embodiments, the speaker box 551 may be coupled to the middle plate 501a in various ways using a bolt, an adhesive, or the like. The speaker box 551 may be a portion of the second support member 370.

The first magnet 552 may be mounted inside the speaker housing. The first magnet 552 may be a permanent magnet. The second magnet 553 may be located within the first magnet 552, i.e. within a space defined by the first magnet 552. For example, the first magnet 552 may surround the second magnet 553. The second magnet 553 may be a permanent magnet. At least a portion of the second magnet 553 may be disposed between the speaker plate 510 and the speaker yoke 507. The speaker plate 510 may be disposed on a first surface of the second magnet 553, and the speaker yoke 507 may be disposed on a second surface of the second magnet 553. The speaker plate 510 and the speaker yoke 507 may be made of metal materials (e.g., steel) and may be attached to the upper and lower surfaces of the second magnet 553. Here, with respect to the surfaces of the second magnet 553, the surface facing the diaphragm 555 may be referred to as the upper surface (first surface) of the second magnet 553, and the surface facing the magnetic shield structure 508 may be referred to as the lower surface (second surface) of the second magnet 553.

The coil 554 is mounted inside the speaker housing and may be disposed between the first magnet 552 and the second magnet 553. The coil 554 may be a voice coil. The coil 554 may generate a magnetic force when a current is applied.

The coil 554 may be moved back and forth (vibrated) by changes in the magnetic force between the first magnet 552 and the second magnet 553. In an embodiment, the diaphragm 555 may be coupled to the coil 554. The diaphragm 555 may generate a sound due to the vibration of the coil 554. The front sound generated by the diaphragm 555 may move toward the rear plate 540, hit the inner wall of the speaker box 551, and then move along a passage of the speaker box 551. The passage of the speaker box 551 may lead to the discharge hole 501c. The front sound generated by the diaphragm 555 thus may be emitted to the exterior of the side bezel structure 501b via the passage through the discharge hole 501c.

In an embodiment, the rear sound generated by the diaphragm 555 may move along the opening of the speaker yoke 507.

In an embodiment, the magnetic shield structure 508 can be coupled with a portion of the frame 509. The magnetic shield structure 508 may be shaped like a plate with sides extending in the vertical direction at both ends. The magnetic shield structure 508 may have a shape of a plate in a first direction (horizontal direction) with sides extending from both ends in a second direction (vertical direction). The magnetic shield structure 508 may have a shape of a plate with wings at both ends. In one embodiment, the magnetic shield structure 508 may have a shape of uppercase "C" or lowercase "n". In one embodiment, the magnetic shield structure 508 may have a lid-shape.

In an embodiment, the first magnet 552 and the second magnet 553 may be mounted within the sides extending in the vertical direction from the ends of the plate of the magnetic shield structure 508. The first magnet 552 and the second magnet 553 may be mounted in an inner space where the plate of the magnetic shield structure 508 is coupled with the frame 509. The magnetic shield structure 508 can be coupled with the frame 509. At least a portion of the vertically extending sides of the magnetic shield structure 508 may be coupled with the frame 509.

The first surface (i.e. upper surface as shown in FIG. 5) of the speaker housing may face the display 512 or the electromagnetic induction panel 513, the second surface may face in the opposite direction of the display 512 (e.g., rear plate 540), and the frame 509 may surround the space between the first surface and the second surface. The magnetic shield structure 508 may be disposed on the first surface of the speaker housing. The magnetic shield structure 508 disposed on the first surface of the speaker housing may face the speaker yoke 507, and the magnetic shield structure 508 may extend to at least a portion of the side (e.g., frame 509) of the speaker housing from the first surface of the speaking housing.

The speaker housing may be a speaker structure located in the space between the display 512 (or, electromagnetic induction panel 513) and the rear plate 540. The diaphragm 555 may be disposed on the second surface (i.e. lower surface as shown in FIG. 5) of the speaker housing.

In an embodiment, at least a portion of the magnetic shield structure 508 may be coupled with the speaker yoke 507 using the adhesive member 506, and at least a portion of the magnetic shield structure 508 may be coupled with the middle plate 501a.

In an embodiment, the electronic device 500 may not include the middle plate 501a. In this case, at least a portion of the magnetic shield structure 508 may be coupled to the bottom of the display 512 or the electromagnetic induction panel 513.

In an embodiment, the magnetic shield structure 508 may be made of a ferromagnetic material (e.g., steel plate cold commercial (SPCC)) or a metal material (e.g., steel).

Figure 7:
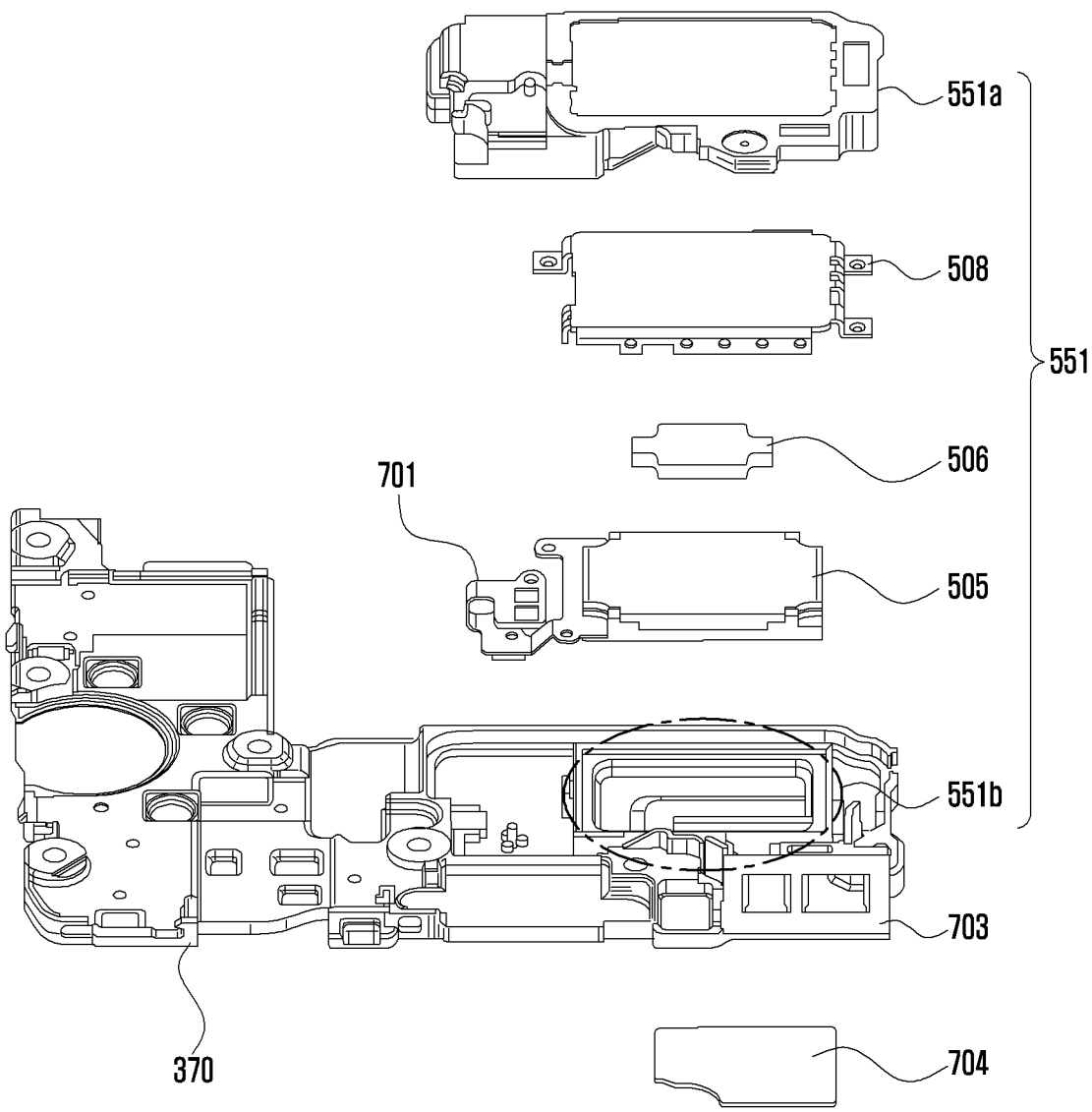
FIG. 7 is an exploded perspective view of region 601 in FIG. 5 according to an embodiment of the disclosure.

FIG. 7 is an exploded perspective view of region 601 in FIG. 5 according to an embodiment of the disclosure.

The speaker box 551 includes a box upper cover 551a and a box bottom lower cover 551b. The box bottom lower cover 551b may be included in at least a portion of the second support member 370. At least a portion of the second support member 370 may be coupled to the speaker hole 703 of the speaker box 551, and the speaker hole 703 of the speaker box 551 may be connected to the speaker hole 501c of the side bezel structure.

The box upper cover 551a and the box bottom lower cover 551b may be combined to form the speaker box 551, and the speaker box 551 may contain the speaker 505, the adhesive member 506, and the magnetic shield structure 508.

The lower support member 704 may be coupled to a region corresponding to the speaker 505 in the lower portion of the second support member 370 (e.g., lower portion of the box bottom lower cover 551b).

The speaker 505 may further include a connector 701 for electrically connecting the speaker 505 to the electronic device 500.

The frame of the speaker 505 (frame 509 in FIG. 5) may be combined with the magnetic shield structure 508 having a shape of a plate with surfaces extending in the vertical direction at both ends to form the speaker housing.

The speaker 505 may be coupled to the magnetic shield structure 508 with the speaker yoke 507 facing the magnetic shield structure 508.

The speaker 505 and the magnetic shield structure 508 may be coupled together by using the adhesive member 506. The adhesive member 506 may be made of polyurethane.

In various different embodiments, the magnetic shield structure 508 may have a shape of a plate with surfaces extending in the vertical direction at both ends. The magnetic shield structure 508 may have a shape of a plate in a first direction (horizontal direction) with surfaces extending from both ends in a second direction (vertical direction). The magnetic shield structure 508 may have a shape of a plate with wings at both ends. In one embodiment, the magnetic shield structure 508 may have a shape of uppercase "C" or lowercase "n". In one embodiment, the magnetic shield structure 508 may have a lid-shape.

Figure 8:
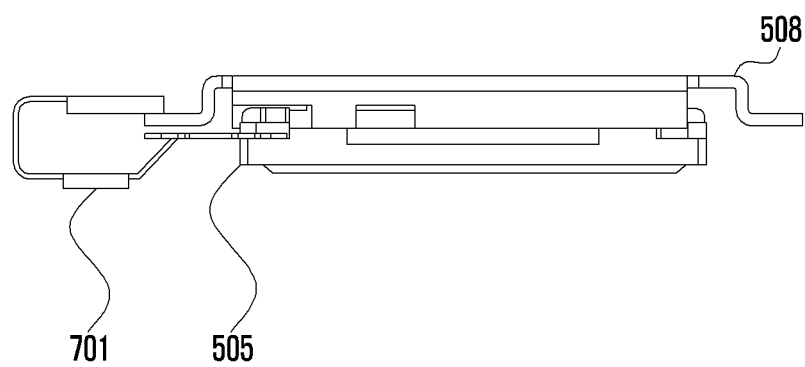
FIG. 8 is a cross-sectional view showing a speaker housing according to an embodiment of the disclosure.

FIG. 8 is a cross-sectional view showing a speaker housing according to an embodiment of the disclosure.

The frame (frame 509 in FIG. 5) of the speaker 505 may be combined with the magnetic shield structure 508 having a shape of a plate with surfaces extending in the vertical direction at both ends to form the speaker housing.

The speaker 505 may further include a connector 701 for electrically connecting the speaker 505 to the electronic device 500.

Figure 9:
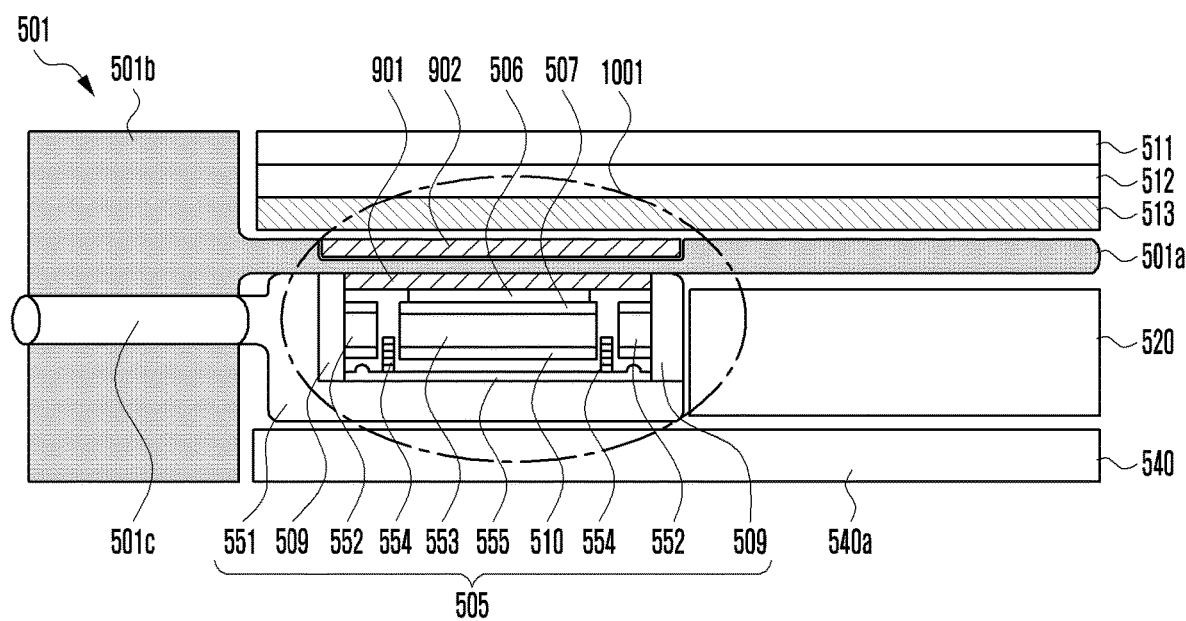
FIG. 9 is a cross-sectional view showing the speaker, a first magnetic shield structure, and a second magnetic shield structure of the electronic device according to an embodiment of the disclosure.
Figure 10:
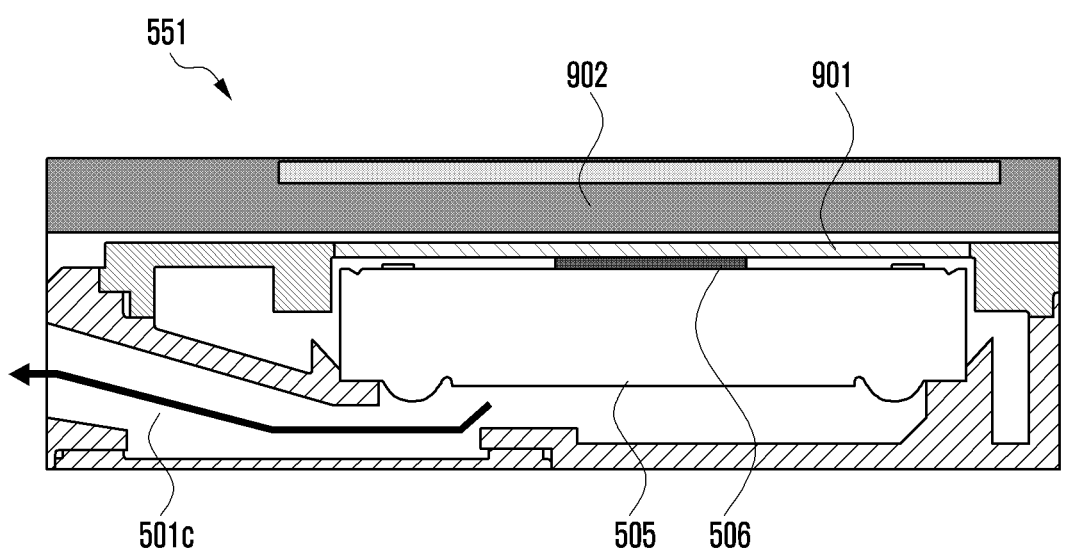
FIG. 10 is an enlarged view of region 1001 in FIG. 9 depicting the speaker, the first magnetic shield structure, and the second magnetic shield structure according to an embodiment of the disclosure.

FIG. 9 is a cross-sectional view showing the speaker 505, a first magnetic shield structure 901, and a second magnetic shield structure 902 of the electronic device 500 (e.g., electronic device 300 in FIG. 3) according to an embodiment of the disclosure. FIG. 10 is an enlarged view of region 1001 in FIG. 9 depicting the speaker 505, the first magnetic shield structure 901, and the second magnetic shield structure 902 according to an embodiment of the disclosure.

With reference to FIGS. 9 and 10, in one embodiment, the electronic device 500 may include a housing 501 including 501a and 501b (e.g., housing 110 in FIG. 1), a speaker 505, and a first magnetic shield structure 901. The components of the electronic device 500 in FIGS. 9 and 10 may be the same as or similar to those described in connection with FIG. 5.

In the speaker 505, the first magnetic shield structure 901 and the frame 509 may form the speaker housing, and a diaphragm 555 may be disposed on at least a portion of the housing.

At least a portion of the middle plate 501a may include a second magnetic shield structure 902. The second magnetic shield structure 902 may be disposed at a region corresponding to the speaker housing on a surface of the middle plate 501a. The second magnetic shield structure 902 may be combined with the middle plate 501a to form one housing. For coupling with the second magnetic shield structure 902, the middle plate 501a may have a recess in the shape of the second magnetic shield structure 902.

The second magnetic shield structure 902 may be disposed on the middle plate 501a and may be disposed below the display 512 or the electromagnetic induction panel 513 at a location corresponding to the location of the speaker 505.

The second magnetic shield structure 902 may have an area larger than that of the upper surface of the speaker housing. Alternatively, the second magnetic shield structure 902 may have an area equal to that of the upper surface of the speaker housing.

The first magnet 552 may be mounted in the speaker housing. The first magnet 552 may be a permanent magnet. The second magnet 553 may be placed inside the first magnet 552, i.e. within a space defined by the first magnet 552. For example, the first magnet 552 may surround the second magnet 553. The second magnet 553 may be a permanent magnet. The speaker plate 510 and the speaker yoke 507 may be disposed on at least a portion of the second magnet 553. The speaker plate 510 may be disposed on a first surface of the second magnet 553, and the speaker yoke 507 may be disposed on a second surface. The speaker plate 510 and the speaker yoke 507 may be made of metal materials (e.g., steel) and may be attached to the upper surface and the lower surface of the second magnet 553. Here, the surface of the second magnet 553 facing the diaphragm 555 may be referred to as the upper surface, and the surface of the second magnet 553 facing the first magnetic shield structure 901 may be referred to as the lower surface.

In an embodiment, the first magnetic shield structure 901 may be coupled with a portion of the frame 509. The first magnetic shield structure 901 may have a shape of a plate. The first magnet 552 and the second magnet 553 may be mounted in an inner space where the plate of the first magnetic shield structure 901 and the frame 509 are coupled to each other. The first magnetic shield structure 901 can be coupled with the frame 509. At least a portion of the first magnetic shield structure 901 may be coupled with the frame 509.

In an embodiment, at least a portion of the first magnetic shield structure 901 can be coupled with the speaker yoke 507 using the adhesive member 506, and at least a portion of the first magnetic shield structure 901 may be coupled with the middle plate 501a.

In a certain embodiment, the electronic device 500 may not include the middle plate 501a. In this case, at least a portion of the first magnetic shield structure 901 may be coupled to the lower portion of the display 512 or the electromagnetic induction panel 513.

In an embodiment, the first magnetic shield structure 901 and/or the second magnetic shield structure 902 may be made of a ferromagnetic material (e.g., steel plate cold commercial (SPCC)) or a metal material (e.g., steel).

In a certain embodiment, the electronic device 500 may not include the second magnetic shield structure 902. In this case, the magnetism generated by the speaker 505 may be shielded only by the first magnetic shield structure 901.

In an embodiment, the electronic device 500 may include the second magnetic shield structure 902 together with the magnetic shield structure 508 described in FIGS. 5 to 7. The electronic device 500 described in FIGS. 5 to 7 may include the second magnetic shield structure 902 at a portion of the middle plate 501a together with the magnetic shield structure 508 having surfaces extending in the vertical direction at both ends.

The first surface of the speaker housing may face the display 512 or the electromagnetic induction panel 513, the second surface may face in the opposite direction of the display 512 (e.g., rear plate 540), and the frame 509 may surround the space between the first surface and the second surface. The first magnetic shield structure 901 may be disposed on the first surface of the speaker housing. The first magnetic shield structure 901 disposed on the first surface of the speaker housing may face the speaker yoke 507. The diaphragm 555 may be disposed on the second surface of the speaker housing.

The speaker housing may be a speaker structure placed in the space between the display 512 (or, electromagnetic induction panel 513) and the rear plate 540.

Figure 11:
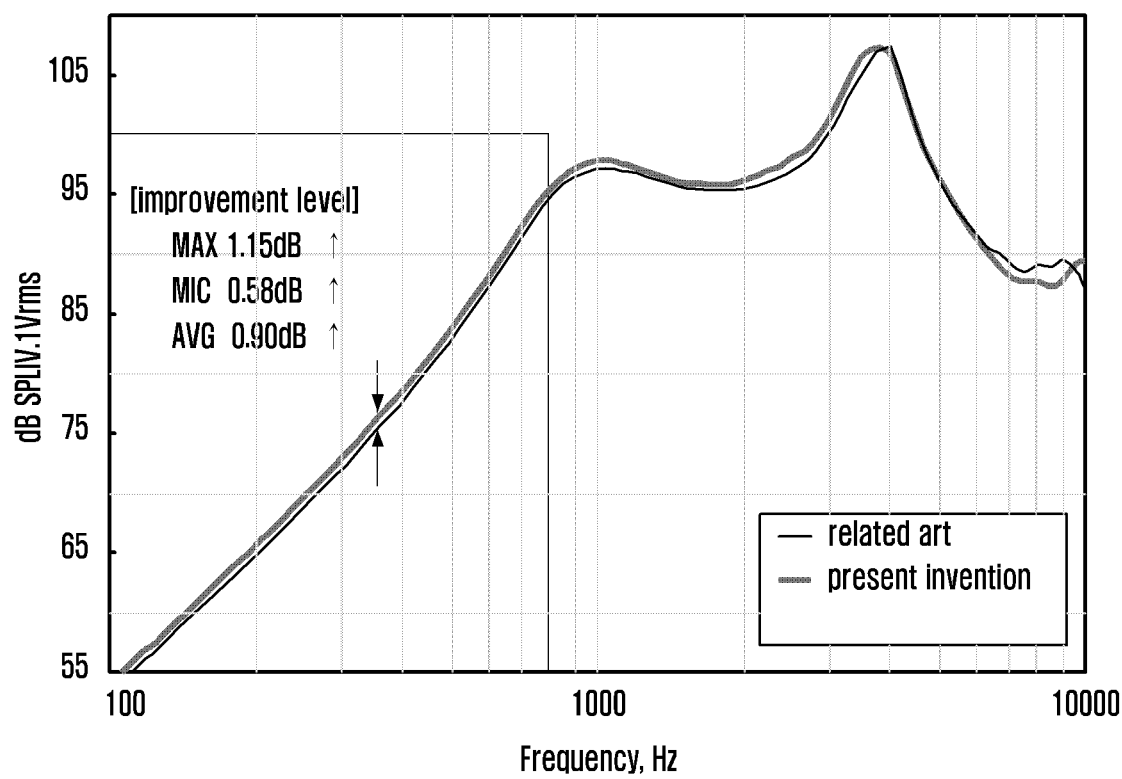
FIG. 11 is a chart showing a comparison in terms of sound pressure between a speaker including the magnetic shield structure according to one or more embodiments of the disclosure and a conventional speaker in the related arts.

FIG. 11 is a chart showing a comparison in terms of sound pressure between a speaker including the magnetic shield structure according to one or more embodiments of the instant disclosure and a conventional speaker in the related arts.

When the conductor length (voice coil) and the current (current flowing through the coil) are the same, the magnetic shield structure of the instant disclosure can increase the magnetic flux density.

The increase in magnetic flux density can increase the sound pressure according to the equation F=BiL (where F is the force, B is the magnetic flux, i is the current, and L is the conductor length).

Comparing the sound pressure of a speaker including the magnetic shield structure according to one or more embodiments of the instant disclosure with the sound pressure of a conventional speaker, there is an increase of 0.9 dB on average in the range of 100 to 800 Hz, and the same or higher performance is achieved in the range of 800 Hz or higher.

The electronic device according to various embodiments disclosed herein can be one of various types of devices, such as portable communication devices (e.g., smartphones), computers, portable multimedia devices, portable medical instruments, cameras, wearable devices, and home appliances. However, the electronic device is not limited to the above-mentioned devices.

It should be understood that the various embodiments of the disclosure and the terminology used therein are not intended to limit the techniques described herein to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (operatively or communicatively) "coupled with/to" or "connected with/to" another element (e.g., second element), it can be coupled or connected with/to the other element directly (wiredly), wirelessly, or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit of a single-bodied component or a part thereof. The module may be the minimum unit, or a part thereof, which performs one or more particular functions. For example, a module may be implemented in the form of an application-specific integrated circuit (ASIC).

Various embodiments of the disclosure may be implemented in software (e.g., programs 140) including instructions stored in a machine-readable storage medium (e.g., internal memory 436 or external memory 438) readable by a machine (e.g., electronic device 401). For example, the machine (e.g., processor 420 of the electronic device 401) can fetch a stored instruction from a storage medium and execute the fetched instruction. When the instruction is executed by the machine, the machine may perform at least one function corresponding to the instruction. The instructions may include a code generated by a compiler and a code executable by an interpreter. The machine-readable storage medium may be provided in the form of a non-transitory storage medium. Here, "non-transitory" means that the storage medium does not include a signal (e.g. electromagnetic wave) and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may be composed of one or more elements. An existing component may be omitted, and a new component may be added. Alternatively or additionally, some of the components may be combined into one entity while maintaining the same functionality. Operations supported by a module, program, or another component may be carried out in sequence, in parallel, by repetition, or heuristically. Some operations may be executed in a different order or may be omitted, and a new operation may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a housing including a front plate, a rear plate facing away from the front plate, and a side member surrounding a first space between the front plate and the rear plate;
a display panel exposed to an exterior of the electronic device through the front plate and configured to detect a pen input using a magnetic field;
a speaker structure disposed between the display panel and the rear plate, and including:
a speaker housing encapsulating the speaker structure, the speaker housing including a first surface facing the display panel, a second surface facing in a direction opposite the display panel, and a side surface surrounding a second space between the first surface and the second surface;
a yoke facing the first surface and disposed within the speaker housing; and
a first shield structure made of a ferromagnetic material and disposed on the first surface such that the first shield structure is at least a part of the speaker housing.

2. The electronic device of claim 1, wherein the first shield structure extends to at least a portion of the side surface of the speaker structure.

3. The electronic device of claim 1, further comprising a middle plate disposed between the display panel and the speaker structure, the middle plate being made of a conductive material, and wherein the first shield structure is disposed between the middle plate and the yoke.

4. The electronic device of claim 3, wherein the middle plate is formed as a single body with the side member or attached to the side member.

5. The electronic device of claim 3, wherein the middle plate contains aluminum.

6. The electronic device of claim 3, further comprising a second shield structure disposed between the display panel and the middle plate, the second shield structure being made of the ferromagnetic material, and wherein the second shield structure is disposed between the display panel and the first shield structure.

7. The electronic device of claim 6, wherein the second shield structure is disposed at a location corresponding to a location of the first surface of the speaker structure and has an area larger than that of the first surface.

8. The electronic device of claim 1, wherein the speaker structure further comprises:
a diaphragm facing the rear plate and spaced apart from the yoke toward the rear plate; and
a magnet disposed between the yoke and the diaphragm.

9. The electronic device of claim 1, wherein the ferromagnetic material includes steel plate cold commercial (SPCC).

10. The electronic device of claim 1, further comprising a speaker box that forms a third space to include the speaker structure and is connected to a through hole penetrating the side member to form an acoustic path.

11. An electronic device comprising:
a housing including a front plate, a rear plate facing away from the front plate, and a side member surrounding a first space between the front plate and the rear plate;
a display panel exposed to an exterior of the electronic device through the front plate;
a speaker box disposed in a second space between the display panel and the rear plate and connected to a through hole penetrating the side member to form an acoustic path; and
a speaker structure disposed within the speaker box,
wherein the speaker structure includes:
a speaker housing encapsulating the speaker structure, the speaker housing including a first surface facing the display panel, a second surface facing a direction opposite the display panel, and a frame surrounding a third space between the first surface and the second surface;
a yoke facing the first surface and disposed within the speaker housing;
a diaphragm disposed on the second surface; and
a first shield structure made of a ferromagnetic material and disposed on the first surface such that the first shield structure is at least a part of the speaker housing.

12. The electronic device of claim 11, wherein the first shield structure extends to at least a portion of the frame of the speaker structure.

13. The electronic device of claim 11, further comprising a middle plate disposed between the display panel and the speaker structure, the middle plate being made of a conductive material, and wherein the first shield structure is disposed between the middle plate and the yoke.

14. The electronic device of claim 13, wherein the middle plate is formed as a single body with the side member or attached to the side member.

15. The electronic device of claim 13, wherein the middle plate contains aluminum.

16. The electronic device of claim 13, further comprising a second shield structure disposed between the display panel and the middle plate, the second shield structure being made of the ferromagnetic material, and wherein the second shield structure is disposed between the display panel and the first shield structure.

17. The electronic device of claim 16, wherein the second shield structure is disposed at a location corresponding to a location of the first surface of the speaker structure and has an area larger than that of the first surface.

18. The electronic device of claim 11, wherein the speaker structure further comprises a magnet disposed between the yoke and the diaphragm.

19. The electronic device of claim 11, wherein the ferromagnetic material includes steel plate cold commercial (SPCC).

* * * * *